United States Patent [19]
Terao

[11] 3,801,966
[45] Apr. 2, 1974

[54] OPTICAL MEMORY DEVICE

[75] Inventor: Motoyasu Terao, Hachioji, Japan

[73] Assignee: Hitachi, Ltd., Tokyo, Japan

[22] Filed: Aug. 18, 1972

[21] Appl. No.: 281,660

[30] Foreign Application Priority Data

Aug. 18, 1971 Japan ............................... 46-62331
Mar. 8, 1972 Japan ............................... 47-23085

[52] U.S. Cl....340/173 LM, 250/219 R, 340/173 LS, 340/173 R

[51] Int. Cl. ......................... G11c 11/42, G11c 13/04

[58] Field of Search ........ 250/219 R, 219 D, 219 Q; 340/173 LM, 173 LS, 173 R

[56] References Cited

OTHER PUBLICATIONS

"Thin Film Chalcogenide– CDS Hetro–Junction Switches Exhibiting Memory" Billings & Malyniak Proceedings of I.R.E.E. Austrailia Vol. 32 No. 6 pp. 248–252, June 1971.

*Primary Examiner*—Terrell W. Fears
*Attorney, Agent, or Firm*—Craig & Antonelli

[57] ABSTRACT

An optical memory device comprising a compound film formed of two materials adjacent to each other; one material being such that its threshold voltage of current controlled differential negative resistance decreases with the light applied, and the other being an amorphous chalcogenide system. This amorphous chalcogenide system includes a substance selected from the group consisting of chalcogenide systems As-Te-Ge, Te-Ge-Sb-S, Te-Ge-S-As, Te-Ge-S-P, Te-Ge-Sb, Te-Ge-Sb-As, Se-Te-Ge, and S-Se-Te, and Zn-As. When a voltage is applied across said compound film, and a specific area of the compound film is irradiated by light, changes are introduced into the amorphous chalcogenide and thus a memory is fixed therein. The device is further characterized in that the material of which the threshold voltage of current controlled differential negative resistance decreases with the light applied, is a control material selected from the group consisting of CdS, CdSe, ZnSe, CdTe, SiO, $Nb_2O_5$, $TiO_2$, SbSI, $PbZrO_3$, NiO, $VO_2$, $Fe_2O_3$ doped with 1–20% Cu, $Fe_3O_4$, MoO, $TiO_2$, $Cu_2O$, yttrium iron garnet doped with silicon Si and also the amorphous chalcogenide systems As-Te-Ge-S, As-Te-Ge-Si, and As-Te-Ge. Also, avalanche photodiode and light actuated silicon controlled rectifier (LASCR) having the same property can be used as the control materal.

22 Claims, 2 Drawing Figures

OPTICAL MEMORY DEVICE

BACKGROUND OF THE INVENTION

1. Field of the Invention

The present invention relates to a device using a material such as amorphous chalcogenide which allows writing of memory or writing/erasing of memory by the flow of current and makes highly dense recording available by light irradiation.

2. Description of the Prior Art

One typically known optical memory device comprises a thin film made of a material such as amorphous chalcogenide which allows writing of memory or writing/erasing of memory by way of current flow, and electrodes attached to the thin film in a matrix form, to which a voltage is applied. This device is operated in such a manner that two of the electrodes corresponding to the X-coordinate and Y-coordinate respectively are selected, thereby determining the coordinates, a voltage is applied and a current is passed between the electrodes at the cross point of these electrodes, changes are introduced into the thin film in the area corresponding to the X-Y cross point whereby writing or erasing of memory is performed. This device, however, has certain drawbacks. For example, the electrode configuration is complicated, the production cost is high, and there are possibilities of breaking leads, if a high density memory is desired. In another prior art method a thin film made of a material such as amorphous chalcogenide which allows writing of memory or writing-erasing of memory by way of current flow is used, and a very small part of the thin film is irradiated by a laser beam whereby writing or erasing of memory is performed. In this method, however, a powerful light source is indispensable for writing or erasing the memory, and there are difficulties in obtaining a light source capable of supplying stable, powerful, high quality light beams. Furthermore, when a picture script is placed in the optical path for recording, a more powerful light source is required. In such case the optical system must withstand the heat of the light applied.

SUMMARY OF THE INVENTION

A general object of the invention is to provide a memory device capable of writing and/or erasing memory without the need for wiring to each memory element and the provision of a powerful light source.

Briefly, in the device of this invention, a current is passed through the specific place of the memory by light irradiation and thus the memory is written or erased.

More specifically, according to the invention, a compound film is formed of two different materials; one, called "A-material" in this specification, is such that the effect of current controlled differential negative resistance, hereinafter referred to as "CCDNR", readily takes place, but the memory effect of low resistance state, hereinafter referred to as current induced memory effect, does not easily occur and the threshold voltage of CCDNR decreases with light irradiation, and the other, called "B-material" in this specification is a material such as an amorphous chalcogenide system which allows writing of memory or writing/erasing of memory by current flow. The compound film is sandwiched between electrodes. The electrodes on at least one side of the film are sufficiently transparent to pass the irradiated light.

Memory writing is performed in the following manner. A specific place on the compound film is irradiated by light from the side of a glass substrate. While doing this, a pulse voltage Vo is applied between the electrodes on the both sides. The value of the pulse voltage is determined so that no turn-on of CCDNR takes place in the A-material unless the specific place on the B-material is irradiated regardless of whether the B-material is in the low or high resistance state. Because the threshold voltage of the CCDNR is lowered in the specific place on the film, a current flows through the A-material and B-material by the pulse voltage Vo, to bring about turn-on of CCDNR. When the pulse voltage is no longer applied a certain definite time after the turn-on of CCDNR, a memory accompanied by changes in the conductivity, dielectric constant, light transmittance, reflection factor, or refractive index is written on the B-material in the area irradiated by light. The A-material resumes the high resistance state as was maintained before light irradiation.

The memory is read in the following manner. The specific place is irradiated by light, and the transmittance, reflection factor or refractive index is measured. Alternatively a pulse voltage that is narrow and low enough so that turn-on of CCDNR occurs but no writing or erasing takes place is applied simultaneously with light irradiation, and the current to flow thereby is measured. Instead, if the A-material is of a substance whose resistance largely decreases with light irradiation, a voltage that is low enough so that no turn-on of CCDNR occurs is applied simultaneously with light irradiation, and the current to flow thereby is measured.

Memory erasing is done in the same manner as writing. If necessary, the light intensity, pulse voltage, or both the light intensity and the pulse voltage, and pulse width differ from that for the memory writing.

The A-material having the desirable properties includes the amorphous chalcogenide systems As-Te-Ge-S, with atomic percentage: 10 to 50% of As, 10 to 50% of Te, 0.1 to 20% of Ge, 0.1 to 30% of S; As-Te-Ge-Si, with atomic percentage: 10 to 40% of As, 30 to 60% of Te, 5 to 20% of Ge, 5 to 20% of Si; As-Te-Ge, with atomic percentage: 50 to 90% of As, 10 to 50% of Te, 0.1 to 10% of Ge; as well as CdSe, CdS, ZnSe, CdTe, SiO, $Nb_2O_5$, $TiO_5$, SbSI, $PbZrO_3$, NiO, $VO_2$, $Fe_2O_3$ doped with 1 to 20% of Cu, $Fe_3O_4$, MoO, $TiO_2$, $Cu_2O$, yttrium iron garnet doped with silicon. Also, operation of the A-material may be provided by an avalanche photodiode and light actuated silicon controlled rectifier (LASCR).

Among the desirable B-materials are: amorphous chalcogenide systems As-Te-Ge, with atomic percentage: 1 to 40% of Ge, 3 to 60% of As, 40 to 85% of Te; Te-Ge-Sb-S with atomic percentage: 70 to 90% of Te, 5 to 20% of Ge, 1 to 5% of Sb, 1 to 5% of S; Te-Ge-S-As, with atomic percentage: 70 to 90% of Te, 5 to 20% of Ge, 1 to 5% of As, 1 to 5% of S; Te-Ge-S-P, with atomic percentage: 70 to 90% of Te, 5 to 20% of Ge, 1 to 5% of S, 1 to 5% of P; Te-Ge-Sb, with atomic percentage: 70 to 90% of Te, 5 to 20% of Ge, 1 to 5% of Sb; Te-Ge-Sb-As, with atomic percentage: 70 to 90 % of Te, 5 to 20% of Ge, 1 to 5% of Sb, 1 to 5% of As; Se-As-Ge, with atomic percentage: 1 to 90% of Se, 1 to 60% of Ge, 1 to 80% of As; Se-Te-Ge, with atomic percentage: 1 to 80% of Se, 10 to 90% of Te, 1 to 50% of Ge; and S-Se-Te, with atomic percentage: 1 to 80% of S, 10 to 90% of Se, 1 to 80% of Te; and Zn-As, with atomic percentage: 40 to 80% of Zn, 20 to 60% of As.

The other objects, features and advantages of the invention will be more apparent from the following description when read in conjunction with the accompanying drawings. It is to be understood that the invention is not limited to specific examples set forth below but numerous modifications may be made thereof without departing from the true spirit of the invention.

DESCRIPTION OF THE PREFERRED EMBODIMENTS

EXAMPLE 1

The elements As (40 atomic percent), Te (50 atomic percent) and Ge (10 atomic percent) are used. These elements are placed in a quartz ampoule. The ampoule is exhausted of air and heated by a gas burner, to melt the elements. After the elements are solidified, the ampoule is sealed up. The desirable vacuum inside the ampoule is $2 \times 10^{-5}$ Torr. Then the ampoule is placed in an electric furnace, heated gradually to 600°C., kept at this temperature for one hour, and then heated to 1,000°C. and kept at this temperature for 18 hours. The ampoule is taken out of the furnace, plunged into water to cool quickly. The sample is withdrawn from the ampoule by breaking the ampoule and crushed into powder in a mortar.

Figure 1:
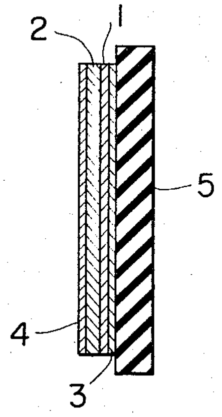
FIG. 1 is a cross sectional diagram showing an optical memory device of this invention.

As shown in FIG. 1, a glass substrate 5 with a Nesa electrode 3 deposited is heated to 200°C. and a layer 1 of CdS is deposited to a thickness of about 1.5$\mu$ by vacuum evaporation. The sample is subjected to heat treatment for one hour twice at 400°C. in a vacuum of about $10^{-3}$ Torr. The substrate is mounted on the evaporation device, the powder of amorphous chalcogenide system As-Te-Ge is placed in a tantalum open boat and then is deposited on the substrate by vacuum evaporation, thereby forming a film 2. In this process, about 100 mg of powder is evaporated by a boat-current being large enough but within a limit where the material in the boat is not scattered. Thus the entire amount of powder material is evaporated in about 15 minutes. Immediately before this evaporation ends, the evaporation shutter is opened to form a film to a thickness of about 700 A. Further on this film, a gold electrode 4 is deposited thinly enough to be semi-transparent, over an area of about 0.1 cm$^2$ In the memory device formed in the foregoing manner, the specific place to be written is irradiated by a light beam which is emitted by a He-Ne laser 6 and whose power is controlled to be 0.01 mW and pulsed by means of an electro-optical shutter 10. This pulse light beam is converged by a lens 9 on the memory device. At the same time, a pulse voltage of 100V, with a pulse width of 0.3 to 5$\mu$s, produced from a pulse source 8 is applied positively to the Nesa electrode 3. The variable resistor 7 is set at a value of about 100$\omega$. After writing in this manner, the vicinity of the written area is irradiated by light from an incandescent lamp. When the transmission light is observed with a microscope having an amplification factor greater than 90 power, a black written-spot with a diameter of about 5$\mu$ can be seen.

Memory reading is performed in the following manner: A laser beam of less than 5 mW is applied to the area from which the memory is read out, a voltage of smaller than 1 V is applied across the electrodes, and the current to flow thereby is measured. In one other procedure the transmitted light is supplied to a photomultiplier tube, photocell, phototransistor, or the like and the resultant output is measured. Further, a picture or a hologram can be recorded by repeatingly applying voltage pulses whose voltage is low and width is narrow and whose height has such a value that writing is scarcely effected when a single voltage pulse is applied. The experimental result on this example shows that when a light beam of 0.1 to 1W is applied, the recording can be obtained with a pulse of 70V, with a width of less than 0.3$\mu$ at a repetition frequency of higher than 10kHz for 30 seconds.

Compared with the prior art using a single film of the amorphous chalcogenide system As-Te-Ge in which the light intensity must be 5 to 10mW for memory writing by the laser beam alone, the memory device of this invention permits memory writing by the irradiation of a light beam whose intensity is one-thousandth as low as that in the prior art. Furthermore, the time needed for memory writing is as short as several microseconds. In practice, the optical energy required to write one bit is about $10^{-11}$ Joule and the energy density is about $10^{-5}$ Joule/cm$^2$. These values are one-thousandth as small as those in the prior art.

EXAMPLE 2

Another optical memory device having the arrangement shown in FIG. 1 is prepared as follows:

A film 1 of amorphous chalcogenide system Ge-As-Te-S, with atomic percentage: 15% of Ge, 35% of As, 30% of Te and 20% of S, and another amorphous chalcogenide film 2 of Ge-As-Te system, with atomic percentage: 15% of Ge, 5% of As and 80% of Te, are formed on a glass substrate 5 by evaporation. These films are sandwiched between a transparent electrode 3 and a thin molybdenum film electrode 4.

In this example, the amorphous chalcogenide elements are placed in a quartz ampoule evacuated to a vacuum of $10^{-5}$ Torr. The ampoule is heated for one hour at 600°C. and then for 18 hours at 1,000°C. Then the ampoule is plunged into water for cooling. The sample is taken out by breaking the ampoule and crushed into powder. The powder is deposited on the substrate to form a film by flash evaporation. Molybdenum is formed into a thin film by sputtering technique.

Figure 2:
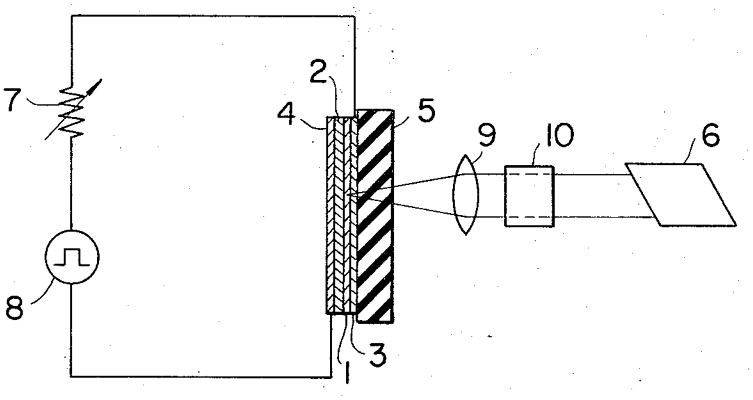
FIG. 2 is a diagram showing a system involving a writing operation using the device of this invention.

The film 1 is 1,000 A thick, and the film 2 is 3,000 A thick. A variable series resistor 7 of 10k$\omega$ is connected as shown in FIG. 2, and a pulse voltage of 20V with a width of about 5 $\mu$s for memory writing or 1 $\mu$ for erasing is applied from a pulse source 8 to the films while the sample is irradiated by the laser beam from an argon ion laser 6.

EXAMPLE 3

As shown in FIG. 1, a transparent electrode 3 is deposited on a glass substrate. The sample is heated to 200°C. and a CdSe film is formed by evaporation on the electrode. The sample is subjected to two-hour heat treatment at 400°C. in oxygen atmosphere. Then, as in Example 2, the amorphous chalcogenide system Ge-As-Te, with atomic percentage: 15% of Ge, 5% of As and 30% of Te, is formed into a film 1 by evaporation. Then a molybdenum thin film electrode 4 is deposited on the Ge-As-Te system film by sputtering.

The film 1 is 2,000 A thick, and the film 2 is 10,000 A thick. A pulse voltage is applied to the sample during laser beam irradiation as in Example 2.

In short, the optical memory device of this invention has various advantages incomparable with the conventional type of optical memories in which memory writing, erasing and reading are done only by irradiating an amorphous chalcogenide material by light. Namely, the device of this invention permits memory writing and reading by very feeble light beam at an intensity less than one-thousandth that in the prior art, by virtue of light irradiation together with voltage impression thereto. Since the electrode structure of the device of the invention is simple, no disadvantage due to wiring appears.

The invention has been described and illustrated in connection with specific embodiments. It is apparent that the invention is not limited to these embodiments. For example, any suitable material having the properties of turn-on of CCDNR and current induced memory effect may be used instead of those mentioned in the foregoing examples.

What is claimed is:

1. An optical memory device comprising:

a first film constituted of a material of which the threshold voltage of current controlled differential negative resistance decreases with light irradiation;

a second film constituted of an amorphous chalcogenide deposited on said first film;

two electrodes disposed on the compound film formed of said first and second films, at least one of the two electrodes being transparent for light;

a means for applying a voltage between said two electrodes; and a means for irradiating a specific area on said compound film by a light beam.

2. An optical memory device in accordance with claim 1, in which said material of which the threshold voltage of current controlled differential negative resistance decreases with light irradiation is one selected from the group consisting of CdS, CdSe, ZnSe, CdTe, SiO, $Nb_2O_5$, $TiO_2$, SbSI, $PbZrO_3$, NiO, $VO_2$, $Fe_2O_3$ doped with 1 to 20% of Cu, $Fe_3O_4$, MoO, $TiO_2$, $Cu_2O$, yttrium iron garnet doped with Si, and amorphous chalcogenide systems As-Te-Ge-S, As-Te-Ge-Si, and As-Te-Ge.

3. An optical memory device in accordance with claim 2, in which said amorphous chalcogenide system As-Te-Ge-S, has composition ranges of 10 to 50% of As, 10 to 50% of Te, 0.1 to 20% of Ge and 0.1 to 30% of S in atomic percentage.

4. An optical memory device in accordance with claim 2, in which said amorphous chalcogenide system As-Te-Ge-Si has composition ranges of 10 to 40% of As, 30 to 60% of Te, 5 to 20% of Ge and 5 to 20% of Si in atomic percentage.

5. An optical memory device in accordance with claim 2, in which said amorphous chalcogenide system As-Te-Ge has composition ranges of 50 to 90% of As, 10 to 50% of Te and 0.1 to 10% of Ge in atomic percentage.

6. An optical memory device in accordance with claim 1 said amorphous chalcogenide material deposited on said first film is a substance selected from the group consisting of the amorphous chalcogenide systems As-Te-Ge, Te-Ge-Sb-S, Te-Ge-S-As, Te-Ge-S-P, Te-Ge-Sb, Te-Ge-Sb-As, Se-Te-Ge, and S-Se-Te, and Zn-As.

7. An optical memory device in accordance with claim 6, in which said amorphous chalcogenide system As-Te-Ge has composition ranges of 1 to 40% of Ge, 3 to 60% of As and 40 to 85% of Te in atomic percentage.

8. An optical memory device in accordance with claim 6, in which said amorphous chalcogenide system Te-Ge-Sb-S has composition ranges of 70 to 90% of Te, 5 to 20% of Ge, 1 to 5% of Sb, and 1 to 5% of S in atomic percentage.

9. An optical memory device in accordance with claim 6, in which said amorphous chalcogenide system Te-Ge-S-As has composition ranges of 70 to 90% of Te, 5 to 20% of Ge, 1 to 5% of As and 1 to 5% of S in atomic percentage.

10. An optical memory device in accordance with claim 6, in which said amorphous chalcogenide system Te-Ge-S-P has composition ranges of 70 to 90% of Te, 5 to 20% of Ge, 1 to 5% of S and 1 to 5% of P in atomic percentage.

11. An optical memory device in accordance with claim 6, in which said amorphous chalcogenide system Te-Ge-Sb has composition ranges of 70 to 90% of Te, 5 to 20% of Ge and 1 to 5% of Sb in atomic percentage.

12. An optical memory device in accordance with claim 6, in which said amorphous chalcogenide system Te-Ge-Sb-As has composition ranges of 70 to 90% of Te, 5 to 20% of Ge, 1 to 5% of Sb, and 1 to 5% of As in atomic percentage.

13. An optical memory device in accordance with claim 6, in which said amorphous chalcogenide system Se-As-Ge has composition ranges of 1 to 90% of Se, 1 to 60% of Ge, and 1 to 80% of As in atomic percentage.

14. An optical memory device in accordance with claim 6, in which said amorphous chalcogenide system Se-Te-Ge has composition ranges of 1 to 80% of Se, 10 to 90% of Te, and 1 to 50% of Ge in atomic percentage.

15. An optical memory device in accordance with claim 6, in which said amorphous chalcogenide system S-Se-Te has composition ranges of 1 to 80% of S, 10 to 90% of Se, and 1 to 80% of Te in atomic percentage.

16. An optical memory device in accordance with claim 6, in which said Zn-As has composition ranges of 40 to 80% of Zn, and 20 to 60% of As in atomic percentage.

17. An optical memory device in accordance with claim 1, wherein said second film of an amorphous chalcogenide has two states of optically different properties, and wherein said voltage applied by said means for applying a voltage between said two electrodes has a value so that electric current flows only at said specific area irradiated by said light beam, said two optically different states being retained independently of said voltage when said specific area is unirradiated by said light beam, and one of said states being transformed to the other by applying erasing voltage pulses between said electrodes.

18. An optical memory device in accordance with claim 1, wherein said means for applying a voltage between said two electrodes applies pulse voltages.

19. An optical memory device in accordance with claim 1, wherein said voltage and said light beam are simultaneously effected on the compound film formed of said first and second films.

20. An optical memory device in accordance with claim 1, wherein said means for irradiating a specific area produces a low intensity light beam.

21. An optical memory device in accordance with claim 20, in which said light beam is a laser light beam having a power of less than 5 mW.

22. An optical memory device in accordance with claim 21, in which said laser light beam has a power of 0.01 mW.

* * * * *